(No Model.)
J. HEMPSTALK.
WEIGHING SCALE.
No. 604,827. Patented May 31, 1898.
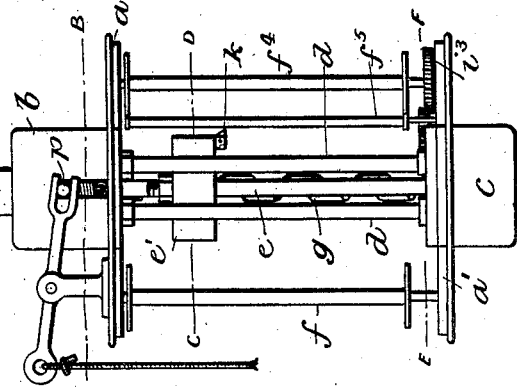
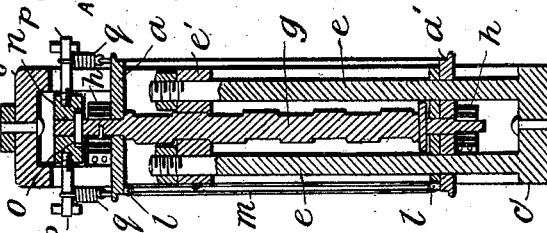
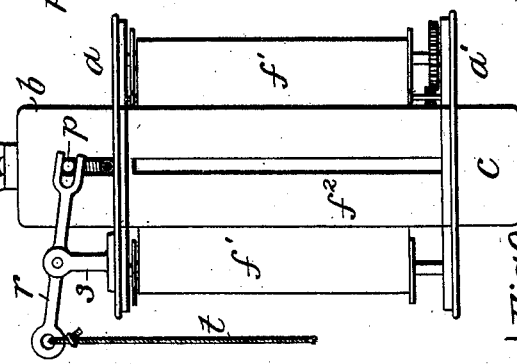
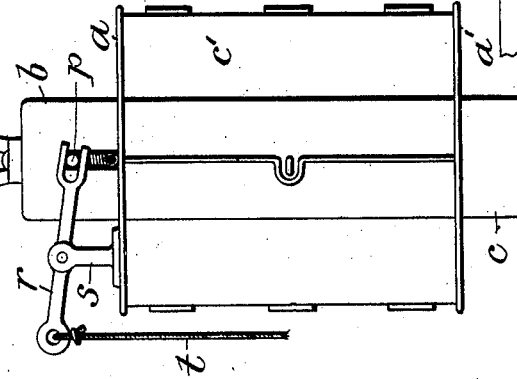
Witnesses
G. P. Kramer.
I. A. Faugrieve
Inventor
John Hempstalk
by
Losen Freeman
Attorneys

UNITED STATES PATENT OFFICE.

JOHN HEMPSTALK, OF LYTTELTON, NEW ZEALAND.

WEIGHING-SCALE.

SPECIFICATION forming part of Letters Patent No. 604,827, dated May 31, 1898.

Application filed March 21, 1895. Serial No. 542,689. (No model.) Patented in New Zealand October 21, 1893, No. 6,503, and in England April 8, 1895, No. 7,184.

*To all whom it may concern:*

Be it known that I, JOHN HEMPSTALK, a subject of the Queen of Great Britain and Ireland, residing at Lyttelton, in the Colony of New Zealand, have invented certain new and useful Improvements in Weighing-Scales, (patented to me in New Zealand, No. 6,503, under date of October 21, 1893, and in Great Britain, No. 7,184, dated April 8, 1895,) of which the following is a specification.

This invention relates to a new or improved weighing and recording scale, which I have designed more particularly for the purpose of weighing and automatically recording the weights of grain in sacks, coal in slings or baskets, or carcasses of meat; but it can also be arranged for weighing and automatically recording the weight of grain or carcasses of frozen sheep on "chutes." A load can be attached to the scale, immediately weighed, the weight indicated in sight of the operator, and at the same time automatically recorded upon a traveling apron inside the casing of scale.

By the use of this scale for the purposes mentioned above a great saving of time is effected and correct weights recorded, thus being of great value to merchants, shippers, ship owners, and ballast men.

The scale may be made of various sizes to suit requirements and may be constructed so as to be capable of weighing and recording as many as ten thousand separate weights.

Referring to the annexed drawings, which form a part of this specification, Figure 1 is a side view of the improved weighing and automatic recording scale. Fig. 2 is a side view of same, the outer casing or jacket being removed. Fig. 3 is a cross-section through center of scale. Fig. 4 is a side view of scale, the outer casing or jacket and also the inner casing and traveling apron being removed. Fig. 5 is a section at A B. Fig. 6 is a section at C D. Fig. 7 is a section at E F. Fig. 8 is a detail view of the indicator-apron. Fig. 9 is a detail view of the marking devices.

Similar letters refer to similar parts in all the figures.

$a$ is the head-plate; $a'$, the bottom plate.
$b$ is the top cup, provided with shackle $b'$.
$c$ is the bottom cup; $c'$, the outer casing or jacket.
$d$ are coupling-rods by which the said top cup, head-plate, and bottom cup and bottom plate are connected.

$e$ is a movable fork which passes through the bottom cup $c$, the upper ends being secured to the fork-head $e'$, the lower end having a shackle $e^2$.

$f$ is a spindle round which an indicator-apron $f'$ is coiled, the outer end of which apron is passed round the casing $f^2$, then inside the curved plate $f^3$, and secured to the spindle $f^4$, a roller $f^5$ being fitted on plate $f^3$ to assist the action of said apron. Longitudinal lines are indicated upon this apron representing weights.

$g$ is a strong screw-spindle which passes through the fork-head $e'$, the said fork-head being screw-threaded for the purpose. The upper and lower ends of this screw-spindle are shouldered to bear against the head-plate and bottom plate, respectively. A spring $h$ is secured to and coiled round each end of said screw-spindle, the outer end of each of said springs being secured to one of the coupling-rods $d$. A toothed wheel $i$ is fitted to the lower end of said screw-spindle, engaging with a smaller toothed wheel $i'$, fitted to bottom plate $a'$, this smaller toothed wheel engaging with another toothed wheel $i^2$, (also fitted to bottom plate $a'$,) which engages with a larger toothed wheel $i^3$, fitted on lower end of spindle $f^4$. The upper side of this larger toothed wheel is recessed and provided with inner teeth, while a pawl $j$ is fitted to spindle $f^4$, engaging the said inner teeth, thus forming a ratchet-wheel. Carried upon the fork-head $e'$ in any suitable manner is a marker $k$, which as it moves in one direction makes contact with the indicator-apron $f'$ to mark the same and drops out of contact therewith as it moves in a reverse direction.

The head-plate and bottom plate are provided with lugs $l$, between which are fitted small rollers, over which a ribbon $m$ passes, the ends of this scale-ribbon being secured to the fork-head $e'$. This scale-ribbon has weights indicated thereon corresponding to the weights indicated upon the apron $f'$. A collar $n$ is fitted over the top of spindle $g$ and is notched out on the under side to fit over the pin $o$ to form a ratchet-wheel. Pins $p$ are passed through slots in the side of cup $b$ and secured to said collar, springs $q$ being attached to said pins and to the head-plate $a$. Bifurcated lever $r$, fulcrumed on standard $s$, clips the pins $p$, the outer ends of said lever having a rope $t$ attached.

The indicator-apron $f'$ may be of paper or other suitable material, while the rest of the scale may be of any suitable metal, the screw-spindle $g$ being preferably of chilled steel.

The scale is so constructed that all the parts can be readily disconnected to allow the springs and apron to be taken out and changed to suit different weights.

The operation of the invention is as follows: When the load to be weighed is attached to the shackle $e^2$, the rope $t$ is pulled down, thereby causing the lever $r$ to raise the collar $n$, and thus release the pin $o$ when the load pulls down the fork $e$ and fork-head $e'$, which in descending turns the screw-spindle $g$, the springs $h$ coiling round ends of said spindle as it turns, while the marker $k$ as the fork-head $e'$ descends marks the indicator-apron $f'$, (which remains stationary, the toothed wheel $i^3$ rotating loosely upon the spindle $f^4$,) and thus records the weight of the load, while at the same time the scale-ribbon $m$ moves upward and also indicates the weight of the load in sight of the operator if the outer casing only is removed. The casing $f^2$ has slots formed therein to allow the ribbon $m$ to be seen. As soon as the load is released the springs $h$ uncoil, causing the screw-spindle $g$ to turn back, thereby raising the fork-head $e'$ to its former position ready for use again. At the same time the toothed wheel $i^3$ by means of the pawl $j$ causes the apron $f'$ to travel forward ready for the next load. The marker $k$ in rising falls down to prevent marking the apron.

Having now described my invention, what I claim as new, and desire to secure by Letters Patent, is—

1. In a self-registering scale, the combination with an indicator-apron, of mechanism for automatically moving the indicator-apron a predetermined distance after a body has been weighed, reciprocating means adapted to be actuated by the body being weighed, and a marking device carried by said means, and adapted to make contact with the indicator-apron when moved in one direction, and to be out of contact with the apron when moved in the opposite direction, substantially as described.

2. In a scale, the combination with a screw-spindle, of a threaded head adapted to travel upon said spindle, means for attaching a weight to the head, devices for automatically returning the head to its normal position after a body has been weighed, and weight-indicating devices actuated by the head, substantially as described.

3. In a self-registering scale, the combination with the weighing mechanism, of an endless scale-ribbon and a support therefor, and means actuated by the weighing mechanism for moving the scale-ribbon, substantially as described.

4. In a self-registering scale, the combination with the weighing mechanism, of a traveling indicator-apron, marking device and an endless scale-ribbon and its support, and means for actuating the indicator-apron, scale-ribbon and marking device, substantially as described.

5. In a self-registering scale, the combination with a traveling indicator-apron, of a marker and means for moving the same in a direction transverse to that in which the indicator-apron travels, devices for returning the marker to its normal position and mechanism for locking it in such position, substantially as described.

6. In a scale, the combination with a screw-spindle, of a threaded head adapted to travel upon said spindle, means for attaching a weight to the head, devices for automatically returning the head to its normal position after a body has been weighed, and a scale-ribbon connected to the said head, substantially as described.

7. In a self-registering scale the combination with a traveling indicator-apron, means for moving it step by step, a marker adapted to reciprocate across the indicator-apron, and to be in contact therewith when moving in one direction only and to be out of contact therewith when moving in the opposite direction and means actuated by the body being weighed to reciprocate the marker, substantially as described.

8. In a scale, the combination with a suitable frame, of a screw-spindle mounted therein, a spring connected to the screw-spindle and frame, of a threaded head adapted to travel upon the screw-spindle, means for attaching a weight to the head, and a scale-ribbon connected to said head, substantially as described.

9. In a self-registering scale, the combination with a screw-spindle, means actuated by the body being weighed for rotating the same, devices for locking the screw-spindle against movement, and means for releasing said locking means, substantially as described.

10. In a self-registering scale, the combination with the weighing mechanism and a marking device carried thereby, of an indicator-apron, devices adapted to hold said apron stationary while the weighing mechanism is moving in one direction and to move it a predetermined distance while the said mechanism is moving in the opposite direction, and the said marking device being adapted to make contact with the indicator-apron when traveling in one direction, and to be out of contact therewith when moved in the opposite direction, substantially as described.

In testimony whereof I have signed my name to this specification in the presence of two subscribing witnesses.

JOHN HEMPSTALK.

Witnesses:
A. H. HART,
GEORGE HART.